United States Patent
Kennedy

(10) Patent No.: US 7,877,960 B2
(45) Date of Patent: Feb. 1, 2011

(54) STRUCTURAL SANDWICH PLATE MEMBERS

(75) Inventor: Stephen John Kennedy, Ontario (CA)

(73) Assignee: Intelligent Engineering (Bahamas) Limited, Nassau (BS)

( * ) Notice: Subject to any disclaimer, the term of this patent is extended or adjusted under 35 U.S.C. 154(b) by 1105 days.

(21) Appl. No.: 10/470,938

(22) PCT Filed: Jan. 15, 2002

(86) PCT No.: PCT/GB02/00157
§ 371 (c)(1),
(2), (4) Date: Oct. 8, 2003

(87) PCT Pub. No.: WO02/068186
PCT Pub. Date: Sep. 6, 2002

(65) Prior Publication Data
US 2004/0067373 A1      Apr. 8, 2004

(30) Foreign Application Priority Data
Feb. 27, 2001    (GB) ................... 0104846.1

(51) Int. Cl.
*E04C 2/38* (2006.01)
(52) U.S. Cl. .................. 52/800.1; 52/784.15; 52/592.1
(58) Field of Classification Search ............... 52/800.1, 52/592.1, 309.2, 784.15, 592.4
See application file for complete search history.

(56) References Cited

U.S. PATENT DOCUMENTS

| | | | | |
|---|---|---|---|---|
| 3,357,146 A | * | 12/1967 | Gartrell | ................. 52/592.4 |
| 3,535,844 A | * | 10/1970 | Glaros | .................... 52/592.1 |
| 3,810,337 A | * | 5/1974 | Pollard | ................... 52/223.8 |
| 4,518,026 A | * | 5/1985 | Otto et al. | ................. 160/232 |
| 5,201,597 A | | 4/1993 | Wurl | |
| 5,373,678 A | * | 12/1994 | Hesser | .................... 52/592.1 |
| 5,678,369 A | * | 10/1997 | Ishikawa et al. | ........... 52/309.9 |
| 5,778,813 A | * | 7/1998 | Kennedy | .................. 114/74 A |
| 6,050,208 A | | 4/2000 | Kennedy | |
| 6,138,435 A | * | 10/2000 | Kocher et al. | ............. 52/800.1 |
| 6,276,748 B1 | * | 8/2001 | Gobessi et al. | ......... 296/190.02 |
| 6,311,454 B1 | * | 11/2001 | Kempel | ................... 52/784.15 |
| 6,418,686 B1 | * | 7/2002 | Record | ................... 52/309.15 |
| 7,100,342 B2 | * | 9/2006 | Holloway | .................. 52/782.1 |

FOREIGN PATENT DOCUMENTS

| | | |
|---|---|---|
| EP | 0 835 749 A2 | 4/1998 |
| GB | 1 451 111 | 9/1976 |
| GB | 2 234 997 A1 | 2/1991 |
| GB | 2 244 237 A1 | 11/1991 |
| GB | 2 355 957 A1 | 5/2001 |

* cited by examiner

*Primary Examiner*—Basil Katcheves
(74) *Attorney, Agent, or Firm*—Nixon & Vanderhye P.C.

(57) ABSTRACT

Various rolled or extruded profiles (1c, 1d) with weld locations are used to connect together structural sandwich plate members comprising first and second outer metal plates (21) and an elastomer core (22) bonded to said outer metal plates (21) with sufficient strength to transfer shear forces therebetween.

7 Claims, 9 Drawing Sheets

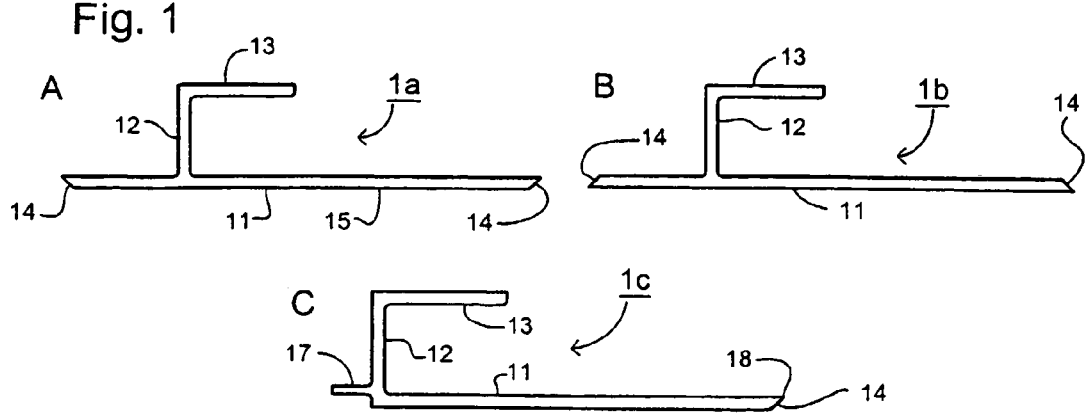
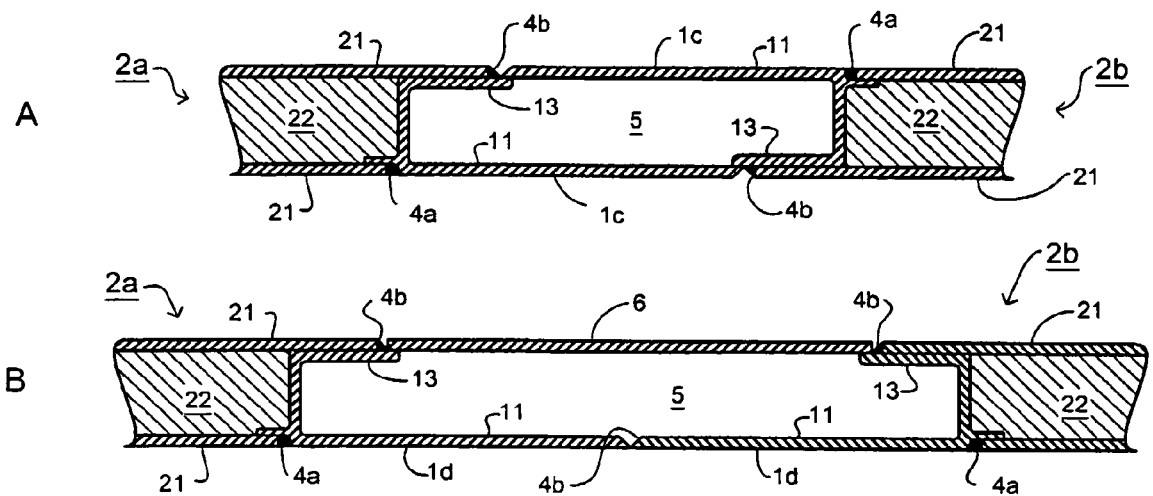
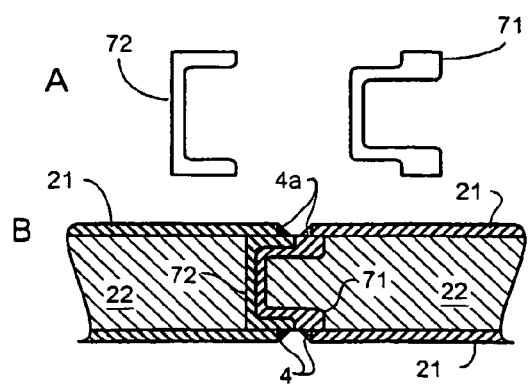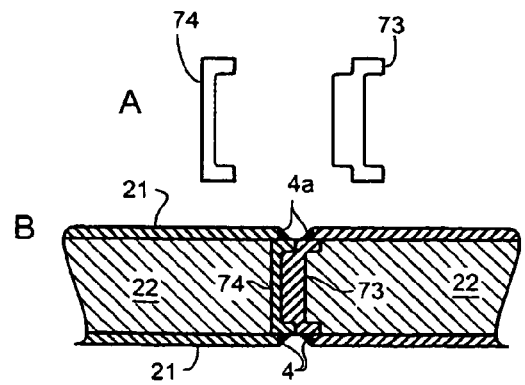

STRUCTURAL SANDWICH PLATE MEMBERS

This is a U.S. national phase application under 35 U.S.C. §371 of International Patent Application No. PCT/GB02/00157, filed Jan. 15, 2002. The International Application was published in English on Sep. 6, 2002 as WO 02/068186 A1 under PCT Article 21 (2).

The present invention relates to structural sandwich plate members which comprise two outer metal plates and a core of plastic or elastomer material bonded to the outer metal plates with sufficient strength to substantially contribute to the structural strength of the member.

Structural sandwich plate members are described in U.S. Pat. No. 5,778,813 and U.S. Pat. No. 6,050,208, which documents are hereby incorporated by reference, and comprise outer metal, e.g. steel, plates bonded together with an intermediate elastomer core, e.g. of unfoamed polyurethane. These sandwich plate systems may be used in many forms of construction to replace stiffened steel plates and greatly simplify the resultant structures, improving strength and structural performance (stiffness, damping characteristics) while saving weight. Further developments of these structural sandwich plate members are described in International Patent Application GB00/04198, also incorporated hereby by reference. As described therein, foam forms may be incorporated in the core layer to reduce weight and transverse metal sheer plates may be added to improve stiffness.

The structural members described in the documents referred to above generally are simple planar members which may be flat or curved (single or double curvature) and which are welded together on site to form the desired structure, e.g. a ship, offshore structure or bridge or other civil engineering structure. In general, ships, offshore structures or civil engineering works constructed with structural sandwich plate members will be fabricated by first welding together the steelwork of the largest practicable section, a hull module for example, containing one or more internal airtight cavities. The elastomer is then injected into those cavities and cured making the section composite. Where panels, sections or modules are connected to form larger or complete structures, weld margins (free of elastomer) must be incorporated to mitigate or prevent damage to the elastomer from heat caused by the welding process. When steel plates of adjacent modules containing structural sandwich plate members are welded together the weld margins form joining cavities. Once all welding is complete, elastomer is injected into the joining cavities to make the structure continuous composite construction. This method of construction places the cured elastomer away from sections or plates being welded. Whilst this method provides satisfactory results, some simplification of this construction method is desirable.

It is an aim of the present invention to provide structural sandwich plate members that can more easily be assembled into ships, ship components, bridges and other civil engineering or offshore structures.

According to the present invention there is provided a structural sandwich plate member comprising: first and second outer metal plates; an elastomer core bonded to said outer metal plates with sufficient strength to transfer shear forces therebetween; and an edge member formed by a rolled or extruded profile fitted between and connected to said first and second outer metal plates and extending along at least a part of the periphery of said outer metal plates and said profile providing a weld location suitable for welding said structural sandwich plate member to another structural sandwich plate member.

The materials, dimensions and general properties of the outer metal plates of the structural sandwich plate member of the invention may be chosen as desired for the particular use to which the structural sandwich plate member is to be put and in general may be as described in U.S. Pat. No. 5,778,813 and U.S. Pat. No. 6,050,208. Steel is commonly used in thicknesses of 2 to 20 mm and aluminium may be used where light weight is desirable. Similarly, the elastomer may be any suitable, e.g. plastics, material such as polyurethane, as described in U.S. Pat. No. 5,778,813 and U.S. Pat. No. 6,050,208.

The rolled or extruded profiles can be made in various forms to be integrated into the structural sandwich plate member to allow members to be prefabricated and made continuous into larger structures by welding members together at the weld locations or members to metal plates (without compromising the structural integrity), simplifying in situ construction.

Profiles according to the present invention are made with rounds, fillets, dimensions and other features to provide good fatigue-resistant connection details, connections with excellent dimensional control for ease of fit up (mating of joining members) and built in weld preparations (full or partial penetration weld preparations, backing bars and/or alignment plates) to reduce fabrication costs and to facilitate in situ welding.

Weld locations based on the profile geometry, are located sufficiently away from the core material so that the welds can be made to prefabricated members without damaging the core or being detrimental to the member's structural characteristics. Weld locations are also located away from local high stress regions which may suffer fatigue problems.

Stiff edge profiles provide dimensional control for joining large sections or modules that advantageously eliminates the time-consuming and expensive heat faring processes associated with stiffened plate construction. Increased bending stiffness along joins between structural sandwich plate members mitigates local weld distortions which simplifies weld details and procedures, and reduces fabrication costs.

Profiles with built-in shear keys, alignment plates and friction connect joints simplify fit-up, thereby reducing fabrication time, labour and cost.

Profile geometries according to the present invention have been developed to provide good details for typical connections between plate members in ships, maritime, civil and offshore structures. Profiles are identified herein by a letter or letters which classify the type of joint, followed by a pair of numbers indicating a critical dimension and the approximate mass of the profile in kilograms per metre of length. For example, E 40×17 is a typical edge profile for a structural sandwich plate member with a 40 mm thick core and has a mass of 17 kg/m. The following table lists some exemplary profile types, gives a brief description and describes their application or use.

| Profile Type | Description/Use |
| --- | --- |
| E | Edge or perimeter profile for connecting large sections or modules that require alignment of ± 5 mm along matching edges on sections measuring up to 50 m by 70 m in cross-section or weighing up to 500 T. |
| SM, SF | Male and female socket profiles fitted around the perimeter of structural sandwich plate members to connect plate members directly to form larger plate members or indirectly through SP or CP profiles. |

-continued

| Profile Type | Description/Use |
| --- | --- |
| P | Plate profile which is integrated into structural sandwich plate members and is used to connect to all-metal webs of transverse and longitudinal girders or bulkheads. |
| T T | Integral through-thickness plate profile for transferring force directly through the structural sandwich plate member. |
| S | Spacer profile to connect and properly space at the specified core thickness metal plates to form structural sandwich plate members. Spacer profiles provide a landing plate combination backing bar for welding plate seams. |
| SP | Sandwich panel profiles which are typically used to connect structural sandwich panel members together to form larger sections or modules, for example decks to side-shell or hull structure to bulkheads. |
| CP | Complex profiles for connecting multiple structural sandwich and metal plate members. Geometries are specific to the given application. Typical examples include: inner bottom/hopper/girder; hopper/side shell/web frame; and stool/inner hull/transverse floor connections. |
| T | Transition profiles for connecting existing metal plates to structural sandwich plate members or as a transition section for a structural overlay. |

Structural sandwich plate members according to the invention may contain one or more cavities and one or more profile types as required for the application and the method by which they are to be connected (welded) to form the complete ship or structure.

The structural profiles, shapes or sections of the invention are generally roll-formed from steel or extruded from aluminium and will almost always be of the same metal as that used to form the outer plates of the structural sandwich plate members of which they form part. The profiles are generally elongate and extend for substantially all of the perimeter, length and/or width of the structural sandwich plate members and/or metal plates which they join.

It should be noted that the various profiles according to the invention may be used with structural sandwich plate members as described in the documents referenced above as well as those according to the present invention.

The present invention will be described below with reference to exemplary embodiments and the accompanying drawings, in which:

FIGS. 1A to C are cross-sections of edge profiles used in structural sandwich plate members according to the present invention;

FIGS. 2A and B are cross-sectional views illustrating two ways in which the edge profiles of FIG. 1C can be used to connect modules comprised of structural sandwich plate members or structural sandwich plate members according to the present invention;

FIGS. 3A and B are cross-sectional views illustrating deep male and female socket profiles according to the present invention and their manner of use;

FIGS. 4A and B are cross-sectional views illustrating shallow male and female socket profiles according to the present invention and their manner of use;

FIGS. 5A to D are cross-sectional views illustrating various plate profiles for connecting structural sandwich plate members to a perpendicular metal plate;

FIG. 6 is a cross-sectional view illustrating a through-thickness plate profile for direct force transmission;

FIGS. 7A and B are cross-sectional views illustrating two alternative spacer profiles for constructing structural sandwich plate members according to the present invention;

FIGS. 8A to G illustrate various structural sandwich panel profiles for joining together multiple prefabricated structural sandwich plate members, e.g. members used to form the deck and side shell connections, bulkhead to hull connections of a bulk carrier, container vessel, tanker, etc., and their manner of use;

FIGS. 9A to J are cross-sectional views of various complex profiles according to the present invention and their manner of use for connecting multiple structural sandwich plate members and metal plates or multiple structural sandwich plate members at acute and obtuse angles;

FIGS. 10A to D are cross-sectional views of transition profiles for transition connections between a structural sandwich plate member and a conventional stiffened metal plate;

Figure 11:
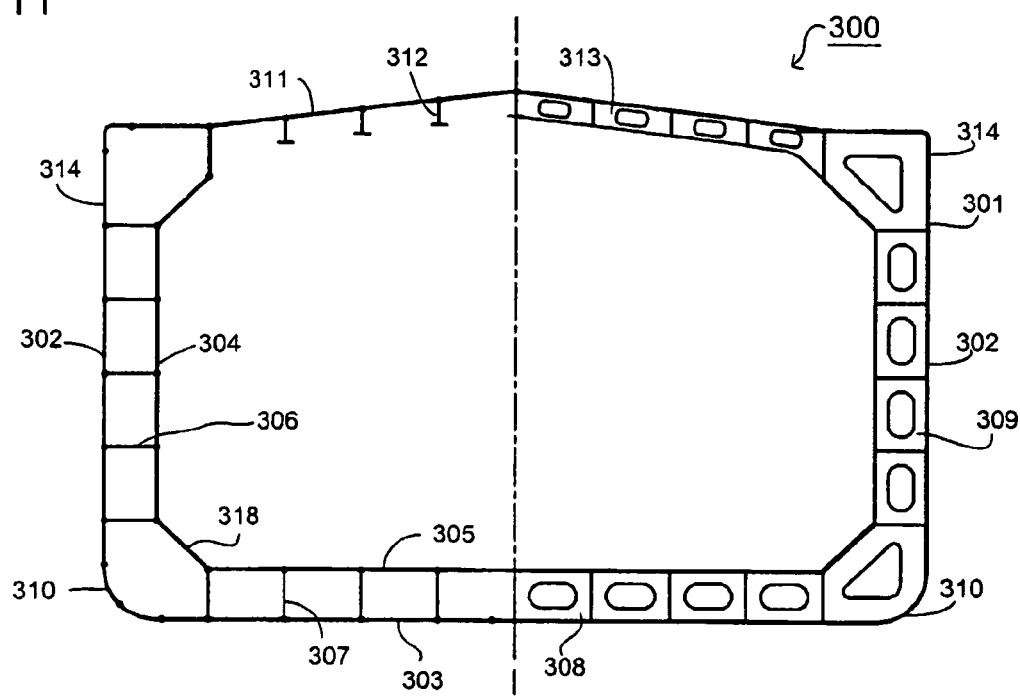
FIG. 11 is a mid-tank cross-section of a product oil tanker constructed using structural sandwich plate members according to the present invention and identifies the type and location of different profiles.
Figure 14:
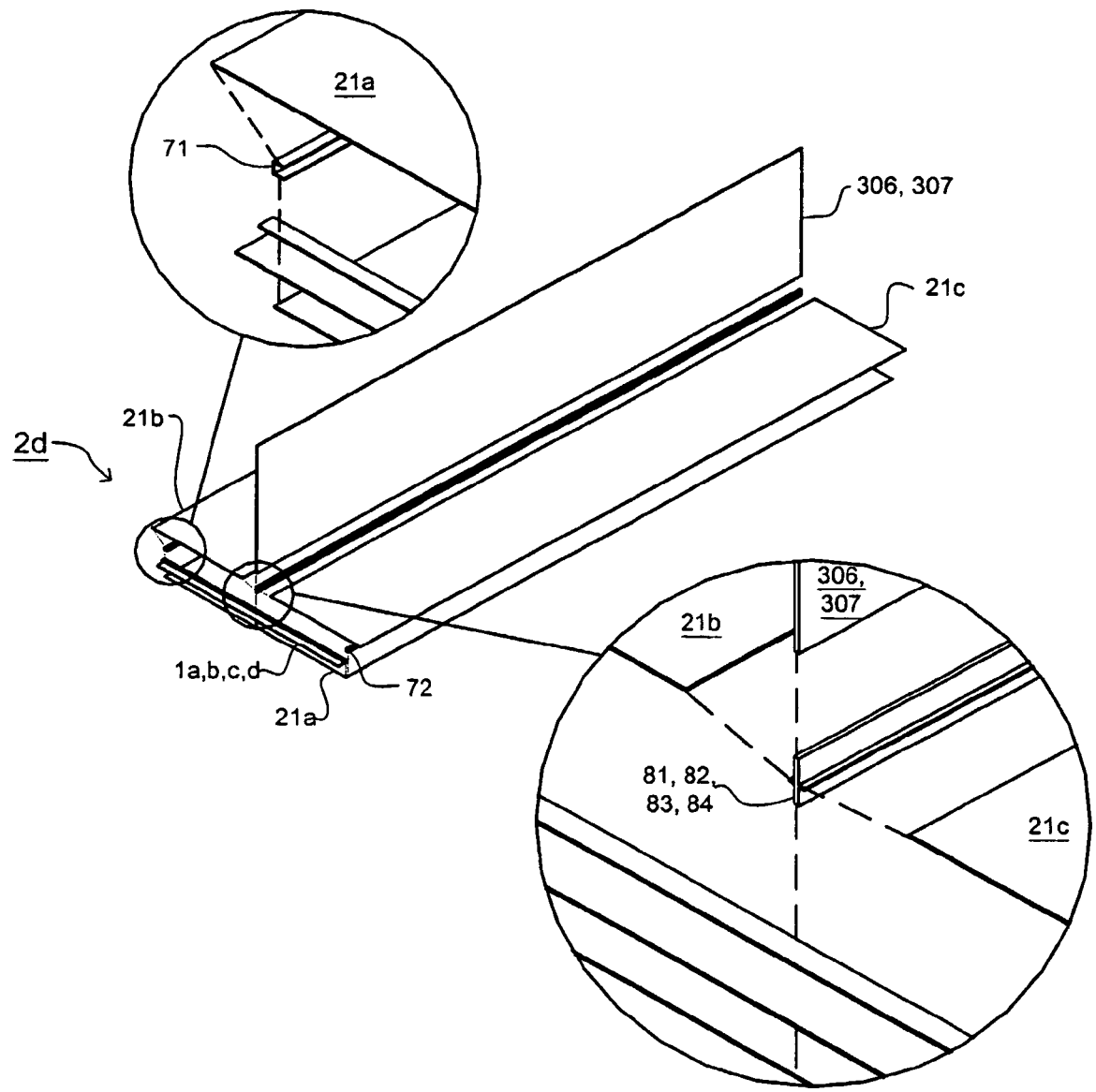
Figure 15:
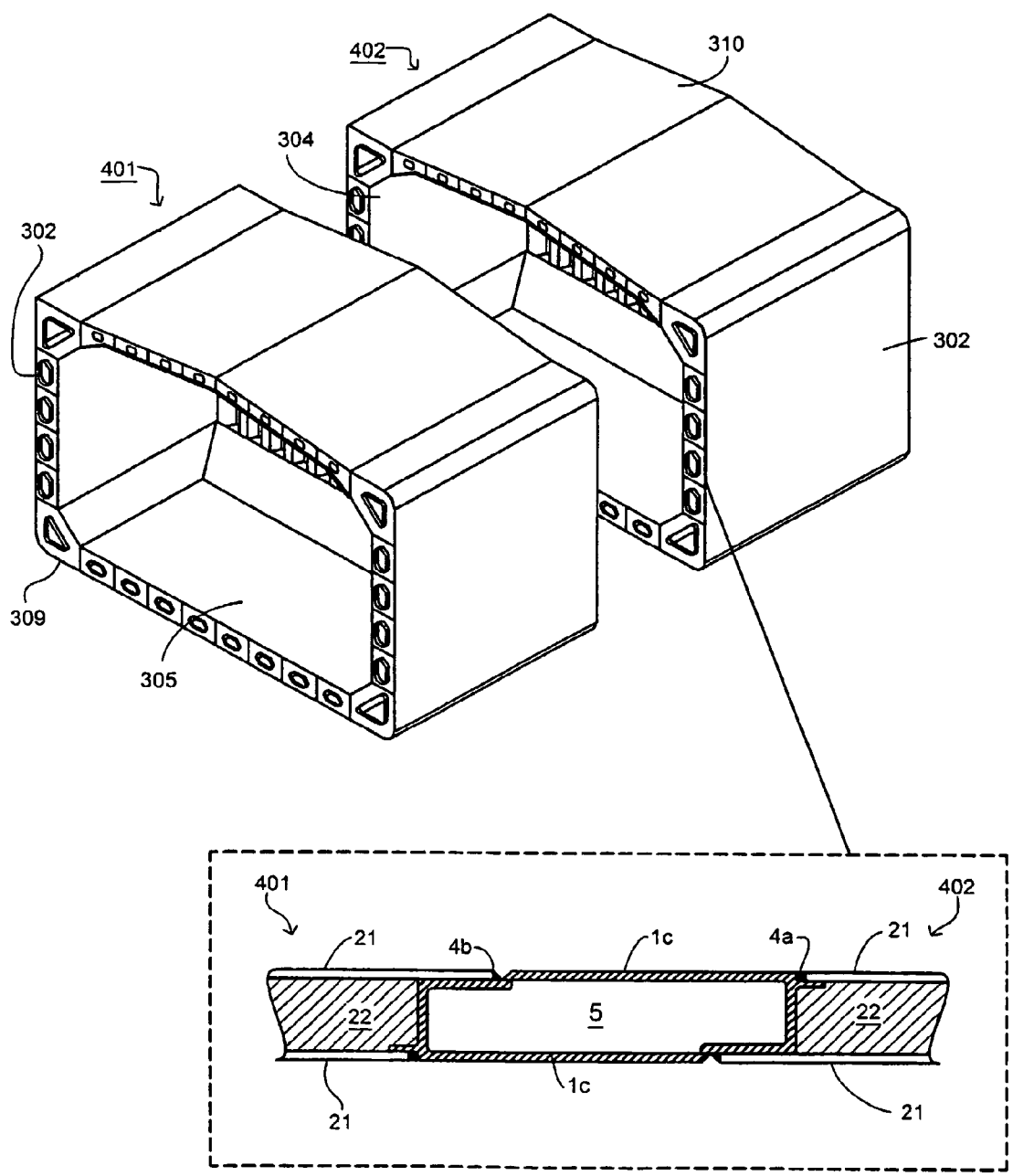

FIG. 14 is a partly-exploded perspective view with enlarged portions showing a structural sandwich plate member with integrated structural profiles according to the present invention and its connection to a longitudinal upstanding metal web; and FIG. 15 is a partly-sectioned perspective view of two mid-tank sections of the product oil tanker of FIG. 11 which illustrates edge profiles and their manner of use for connecting two tank section modules.

In the various drawings, like references denote like parts.

FIGS. 1A to C illustrate edge profiles 1a to c which generally form the outward edge of a structural sandwich plate member such that, when a number of such plate members are formed into a large section or module, the outward edge of that module is largely comprised of edge profiles that can be mated and joined by welding the welding location on the outward edge of an adjacent module. In general, the edge profiles include built-in backing bars and full or partial penetration groove weld preparations at the possible weld locations to eliminate the need of providing or making these in situ. These sections may be roll formed or fabricated from standard shapes and plates in steel. Alternatively they may be extruded in aluminium for applications where light weight is desired, e.g. the upper decks of cruise ships or for hull forms in fast ships. Of course, other metals may be used if desired and structural profiles of different metals may be used together to form structural sandwich plate members according to the invention.

The edge profile 1a shown in FIG. 1A, which is a lateral cross-section, comprises a generally planar portion (long flange) 11 which will form part of one outer plate of a structural sandwich plate member and has sufficient length that the tip can be displaced (e.g. by up to ±5 mm) to be aligned with the adjacent module. Placed inwardly from one edge of the section is an upstanding web 12 which will extend across the thickness of the structural sandwich plate member. At the distal end of the upstanding web 12, a short flange 13 parallel to the long flange 11 and extending towards its centre is provided. Short flange 13 provides a landing surface for the metal plate used to complete the structural sandwich plate member. Full penetration groove weld preparations 14 are provided at the edges of the long flange 11 to enable an adjacent plate or edge profile to be welded to the edge profile from the exterior. As can be seen in the subsequent description, possible weld locations include the full penetration groove weld preparations 14 and the end of the short flange 13.

FIG. 1B illustrates an alternative edge profile 1b similar to that of FIG. 1A and again comprising a plate portion (long flange) 11, upstanding web 12 and short flange 13. In this case, the weld preparations 14 of the long flange 11 enable an adjacent plate or like section to be welded to the edge profile 1b from the interior. FIG. 1C illustrates a further alternative edge profile 1c which again consists of (long flange) plate portion 11, upstanding web 12 and short flange 13 performing the same functions as in the sections 1a, 1b of FIGS. 1A and B. In edge profile 1c of FIG. 1C, the upstanding web 12 is located adjacent one side edge of the long flange 11. The edge weld preparation 14 on the other side may be arranged to enable welding from the exterior, as shown, or to enable welding from the interior, as desired for the intended fabrication sequence. At the base of the upstanding web 12, a small projection 17 is provided, with its lower surface aligned with the inner surface of the long flange 11, to act as a backing bar to receive an adjacent plate. As can be seen in the subsequent description, possible weld locations include the small projection 17, weld preparation 14 and the short flange 13.

It should be noted that in the above and following descriptions, the terms "interior" and "exterior" are used to identify preferred weld direction with respect to their intended location in a structure. In FIGS. 1A to C, the exterior surface of the profile is the lower surface and the interior, the upper surface.

FIGS. 2A and B illustrate two alternative ways in which profiles as shown in FIG. 1C can be used to connect large sections or modules comprised of structural sandwich plate members.

In the arrangement of FIG. 2A, two sections or modules 2a, 2b are constructed of structural sandwich plate members comprising outer metal plates 21 bonded together by an elastomer core 22 which substantially contributes to the structural strength of the member. The edges of the sections 2a, 2b are closed by an edge profile 1c, one section 2a has the long flange 11 of the edge profile 1c downwards (as illustrated) and the other section 2b has the planar portion 11 upwards (as illustrated). The two sections 2a, 2b are fitted together with the free end of the long flange 11 of each edge profile 1c supported by the short flange 13 of the other edge profile 1c. Full penetration groove butt welds 4b are made to connect the adjacent modules together at the weld location. The newly-formed cavity 5 is then injected with elastomer to make the construction continuous. If necessary, the degree of overlap between the short flange 13 of one section and the long flange 11 of the other can be varied to accommodate normal variations in fit-up that are associated with making modules.

In the arrangement of FIG. 2B, two like edge profiles 1d similar to that shown in FIG. 1C are again used. In this case, the edge profiles 1d are positioned with their long flanges 11 on the same side. The weld preparation as shown in FIG. 2B allows the finishing butt weld 4b to be made at the weld location from the interior. Subsequently plate 6, which preferably has the same thickness as the outer plates 21 of modules 2a, 2b, is welded 4b at the weld location to close cavity 5, with the short flanges 13 acting as landing surfaces and backing bars. Cavity 5 is then injected with elastomer to make the connecting plate segment composite. This method of connection between modules allows for greater variations in alignment than the method of FIG. 2A.

In FIGS. 2A and 2B, as well as various of the other figures described below, butt welds made prior to casting of elastomer for the structural sandwich plate members are indicated at 4a. Finishing welds, that join structural profiles and plate members, are indicated at 4b but not all are shown completed.

FIGS. 3A and B illustrate the deep male and female socket profiles and their use to align and join adjacent structural sandwich plate members.

As shown in FIG. 3A a male socket profile 71 and female socket profile 72 have complimentary U-shapes that mate, providing alignment and shear capacity between joining prefabricated structural sandwich plate members. The total depth of the webs of the male and female socket profiles 71, 72 are equal to the core thickness of the sandwich plate member in the edge of which they are fitted. As shown, the two structural sandwich plate members have the same thickness but the socket profiles may be varied to connect together structural sandwich plate members of different thicknesses or different metal plate thicknesses. The socket profiles may extend for some or preferably all of the entire lengths of the edges of the structural sandwich plate members and are welded to metal plates 21 by fillet welds 4a as illustrated in FIG. 3B to form metal boxes with enclosed air-tight cavities. Other profiles may also be integrated into the cavities or used along the edges. These cavities are injected with elastomer 22 and after curing form structural sandwich plate members. Larger sections can be made by mating the male and female socket profiles 71, 72 along the edges of adjacent plate members at the weld locations, as shown in FIG. 3B and making them continuous by welding butt welds (not shown). The deep socket profiles need not be fully butted, as shown in FIG. 3B, but may have a gap between profiles to accommodate misalignment within the plane of the plate members.

FIGS. 4A and B illustrate shallow male and female socket profiles 73, 74 which form one or more edges of a structural sandwich plate member and are used in the same manner as the deep socket profiles 71, 72.

FIGS. 5A to D illustrate various plate profiles that are integrated into structural sandwich plate members and that are used to connect structural sandwich plate members that are in general perpendicular to a metal web.

FIG. 5A illustrates the basic form of a plate profile 81. The lower part of the profile 81 is shaped like an I-beam with upper and lower flanges 811, 812. A web extends above the upper flanges. The flanges 811, 812 act as landing surfaces and backing bars to allow the outer metal plates 21 of structural sandwich plate members 2a, 2b to be welded to the plate profile 81 with butt or full penetration groove welds 4a. The web extending above the upper flanges 811 is used as a weld location to connect to the perpendicular metal web.

Subsequent to welding of all edge and integrated profiles to plates 21, elastomer 22 is injected into the cavities to form the structural sandwich plate members 2a, 2b. Conventional metal plates or webs 61 are welded to the plate profile 81 at the weld location with either full penetration groove welds or butt welds 4b that are located sufficiently away from the core as not to damage it by the welding process.

Variations of the plate profile form with different dimensions, built-in weld preparations, backing bar and alignment plate arrangements are illustrated in FIGS. 5B, 5C and 5D. Plate profiles 82 and 83, shown in FIG. 5B and 5C respectively, are simplified and have one set of landing surfaces/backing bars for the interior one of plates 21. The profile is fillet welded to the exterior one of plates 21 and welded to the web 61 at the weld location with either a one-sided full penetration groove weld or with two-sided partial penetration groove welds. The plate profile 84 shown in FIG. 5D is similar to profile 82 but has an additional backing bar alignment plate 842 to facilitate the welding of the web 61 at the weld location.

Figure 5:
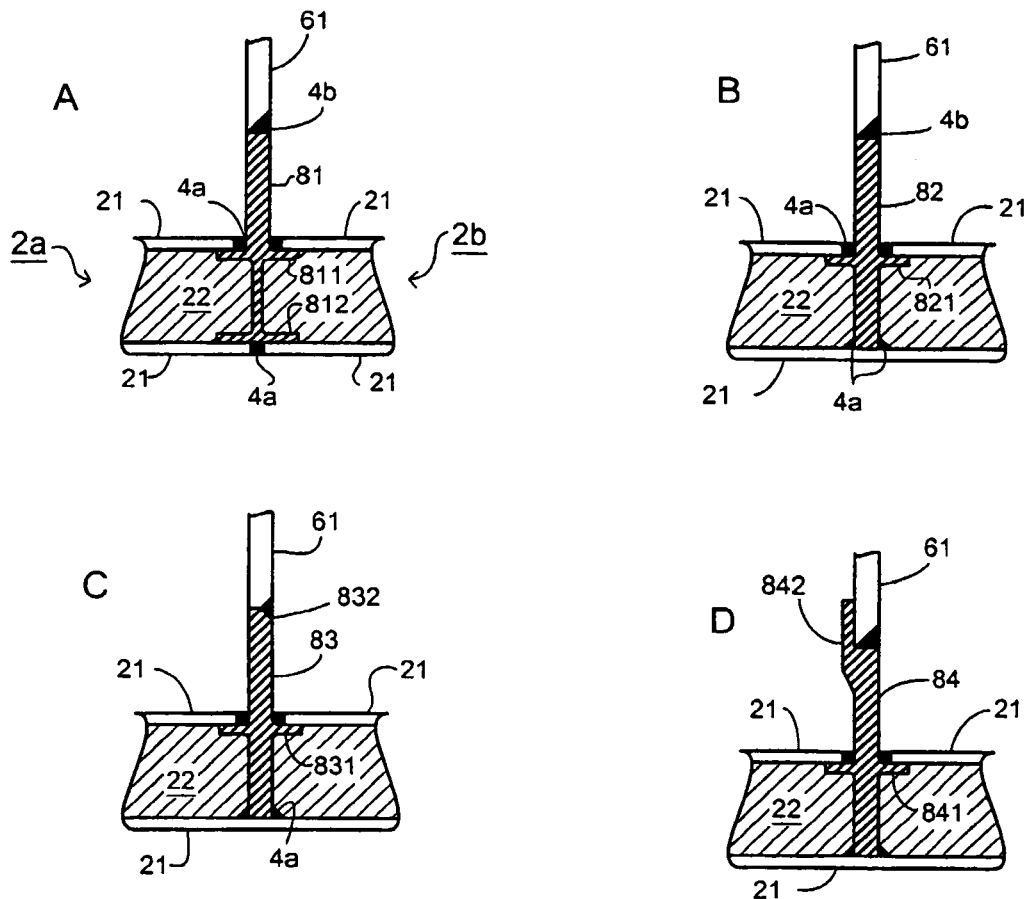
Figure 6:
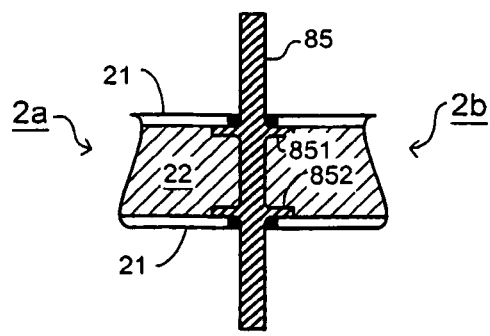

FIG. 6 illustrates a through-thickness profile 85 which can be used to transfer force directly through structural sandwich plate members. The through-thickness profile 85 comprises a plate of constant thickness from which project two spaced apart pairs of flanges 851, 852. These flanges 851, 852 act as landing surfaces and backing bars for plates 21 forming the outer plates of structural sandwich plate elements 2a, 2b which are welded to it. Webs or other conventional metal plates can be welded at weld locations to the through-thickness profile 85 of the precast structural sandwich panel during construction.

Figure 7:
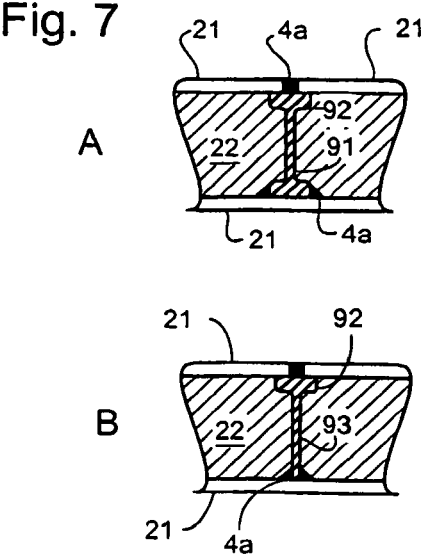

Spacer profiles 91 and 93, shown in FIGS. 7A and 7B, can be used to act as a landing surface and backing bar 92 for making plate seams and to space apart plates 21 which form the outer plates of structural sandwich plate members. Spacer profiles 91 and 93 are I-shaped and T-shaped respectively. Each is first welded with fillet welds to the exterior plate and then to the interior plates at a weld location when the plate seam is welded.

Various sandwich plate profiles 101 to 107 for joining mutually perpendicular structural sandwich plate members are shown in cross-section in FIG. 8A, whilst their manner of use is shown in FIGS. 8B to 8D. These sandwich plate profiles may also be referred to as nodal profiles.

In FIG. 8B three prefabricated sandwich plate members are connected together with two aligned and the third extending perpendicularly from them and is representative of a typical deck to side shell connection detail. The nodal profile 101 used to effect this connection is a roll-formed or extruded section of metal having sockets facing the directions of the structural sandwich plate members which are to be connected. The overall form is H-shaped with the third socket formed by flanges provided on one of the uprights of the H. A male socket profile 102 forming the edge of the prefabricated structural sandwich plate members is inserted into the nodal profile 101 and welded at weld locations to form a continuous structure as shown in FIG. 8C. Finishing welds (not shown) make the joint continuous. Localised welding can be carried out without affecting the structural integrity of the joint.

FIGS. 8D and 8E illustrate the method of use of two nodal profiles 103 and 104 that are used to connect two prefabricated structural sandwich plate members and are again representative of a typical deck side shell construction detail. Nodal profiles 103 and 104 provide a right angle connection with a square outer corner and a chamfered outer corner, respectively. In both cases, the profiles are generally U-shaped with small perpendicular plate protrusions on the outside face of one leg which form the second socket.

FIG. 8F illustrates the method of use for sandwich plate profile 107 that would be used to connect four prefabricated structural sandwich plate members and is representative of a typical inner hull stool bulkhead connection.

FIG. 8G illustrates the method of use for the sandwich plate profile 106 which is integrated into one structural sandwich plate member and subsequently made continuous with two other precast structural sandwich plate members by welding at weld locations. Again, finishing welds are omitted for clarity. In this case, the nodal profile 106 is basically a structural angle with inner small plate protrusions which are perpendicular to the outside face of the legs of the angle. The small plates provide alignment, socket and weld details for accepting two precast structural sandwich plate members.

Figure 8:
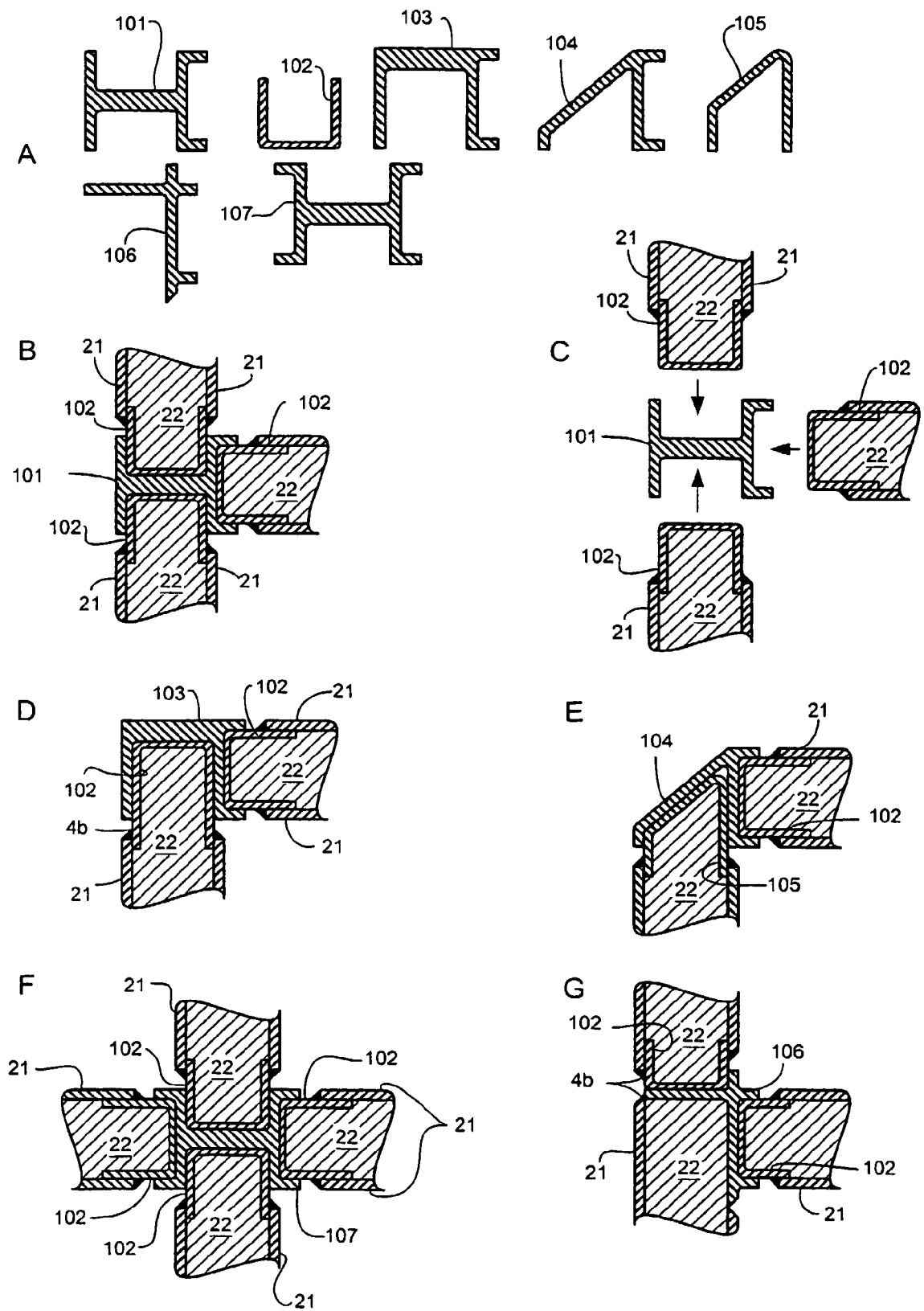

Although not illustrated by any of the profiles in FIG. 8, it is possible to vary the geometry of the profile to change the alignment of the prefabricated structural sandwich plate member from being orthogonal to any other angle. Also, it is preferable with all of the arrangements of FIGS. 8A to G that finishing welds result in smooth outer surfaces to the joints, filling in the gaps between outer plates 21 and the flanges to the nodal profiles.

Figure 9:
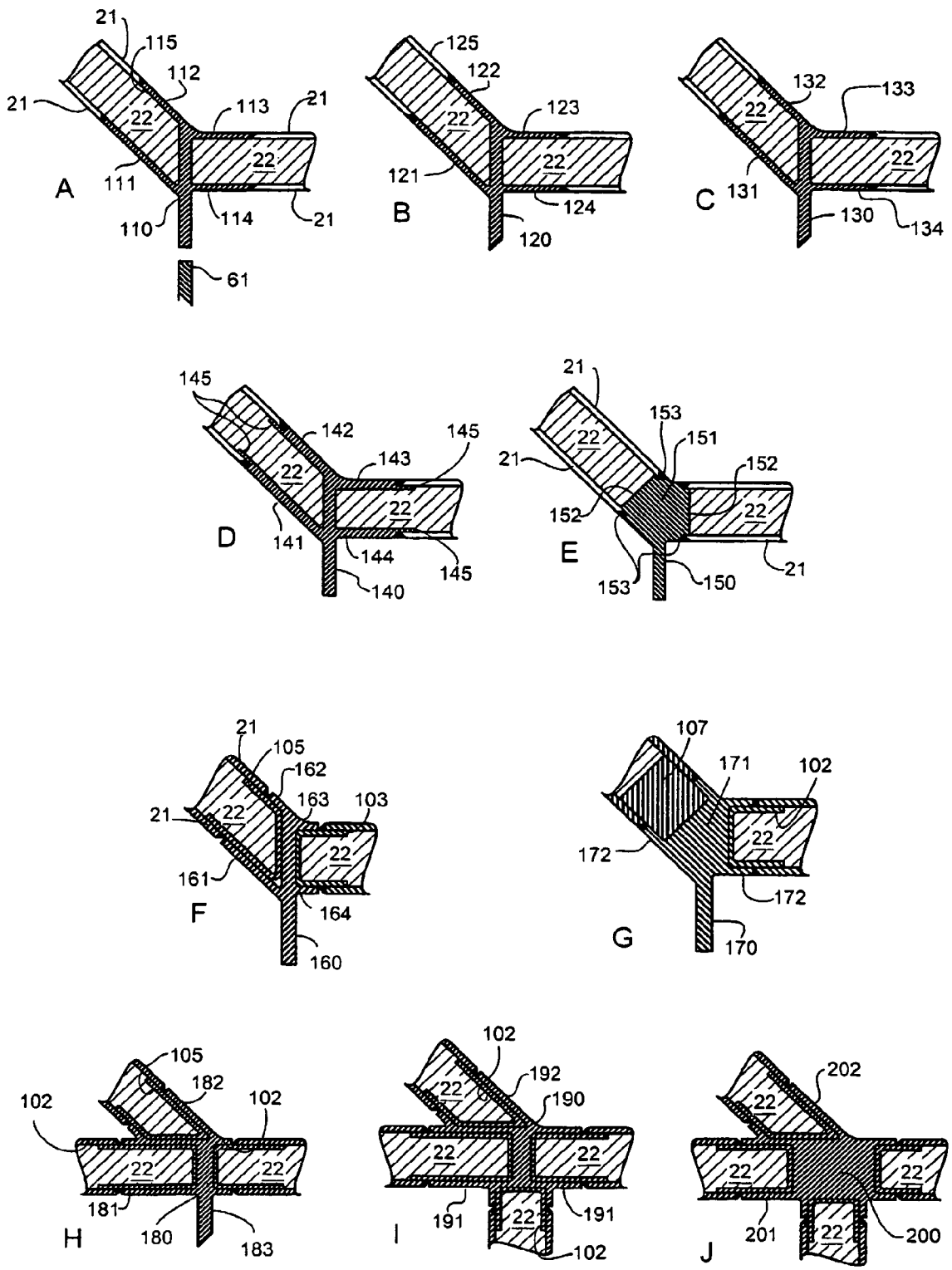

Arrangements to connect angled structural sandwich plate members to each other and to conventional plates in which at least one plate member is framed into the joint at an oblique angle are shown in FIGS. 9A to J. The connections of FIGS. 9A to G are representative of typical connection between a hopper, inner hull bottom and a longitudinal girder, or between the side shell, hopper-side shell and a stringer. Those of FIGS. 9H, I and J can be used for hopper to inner hull bottom to stool connections. FIGS. 9A to E illustrate complex profiles that are integrated into the steel fabrication process prior to the injection of elastomer and their manner of use whilst FIGS. 9F and 9G illustrate complex profiles that join precast structural sandwich plate members.

The working line or centroid of all plate members framing into the connection are aligned to act through the same point so that no eccentric forces act on the profile.

FIG. 9A illustrates a basic form of a complex profile 110 which is used to connect an inclined structural sandwich plate member, a horizontal structural sandwich plate member and a vertical metal plate. The complex profile 110 essentially comprises a vertical plate portion which is to be aligned with and butt welded to a vertical metal plate at a weld location. Four flanges 111-114, extending from the vertical plate portion a distance sufficient to place joining welds to outer plates 61 in a lower stress range region (for better fatigue resistance) are spaced apart and oriented to align with the outer plates 21 of the inclined and horizontal structural sandwich plate members. The outer plates 21 of the structural sandwich plate members are butt welded to the respective tips of flanges 111-114. The extension of the vertical metal plate through the core depth of the structural sandwich plate members transmits the through-thickness forces associated with the vertical force component in the inclined structural sandwich plate member.

FIGS. 9B, 9C and 9D are variations of the basic form of the complex profile which include different weld preparations. The flange tips of flanges 121-124 and 131-134 of complex profiles 120 and 130 in FIGS. 9B and 9C have been bevelled for full penetration groove welds to made form the outside or all from above, respectively. Complex profile 120 in FIG. 9D has integrated backing bars 145 which provide the landing surface and alignment necessary to make butt welds between the outer plates 21 and the complex profile 140 from the preferred directions. Complex profile 150 in FIG. 9E is a variant of complex profile 140 with solid core 151 having side faces 152, facing the structural sandwich plate members and rolled notches 153 that provide the same function as backing bars.

FIGS. 9F and 9G illustrate two additional variations of the basic form of the complex profile in FIG. 9A that would be used to join prefabricated structural sandwich plate members to conventional metal plates. FIG. 9G illustrates the use of a solid metal block or bar 107 as an alternative male socket member to the U-shaped profile and the same solid core variation 171 as illustrated in FIG. 9E. Although not illustrated, complex profiles may be provided that are integrated into one or more structural sandwich plate members and provided with one or more sockets for connection to one or more prefabricated structural sandwich plate members.

FIGS. 9H, I and J illustrate a variety of complex profiles 180, 190, 200 for typical hopper to inner hull bottom to stool connections and their manner of use for joining prefabricated structural sandwich plate members and conventional metal plates. In each case, appropriately oriented and spaced flanges 181, 182, 191, 192, 201, 202 are provided to form sockets to receive male socket members 102, 105 provided in the ends of the structural sandwich plate members and webs 183, 193, 203 transmit through-thickness forces.

FIGS. 10A to C illustrate transition profiles 210, 220, 230 which are used to connect a structural sandwich plate member to an aligned conventional metal plate or web.

As shown in FIG. 10A, transition profile 210 essentially comprises two plate portions 211, 212 which are joined together at one edge, where they are to be welded to the conventional metal plate 73 at a weld location. The upper plate portion 211 is parallel and aligned with the conventional metal plate 73 where as the lower plate portion 212 is inclined so that at the distal edges of the plate portions 213, 214 they are spaced apart by a distance equal to the thickness of the structural sandwich plate member to which the outer plates 21 are welded. The distal end portion 213 of plate portion 212 is made parallel to the other plate portion 211 and the outer plate of the structural sandwich plate member to which it is to be connected. The distal end portions of the plate portions 211, 212 are also provided with backing bars 214 to assist in welding the outer plates 21 of the structural sandwich plate member to transition profile 210.

Figure 10:
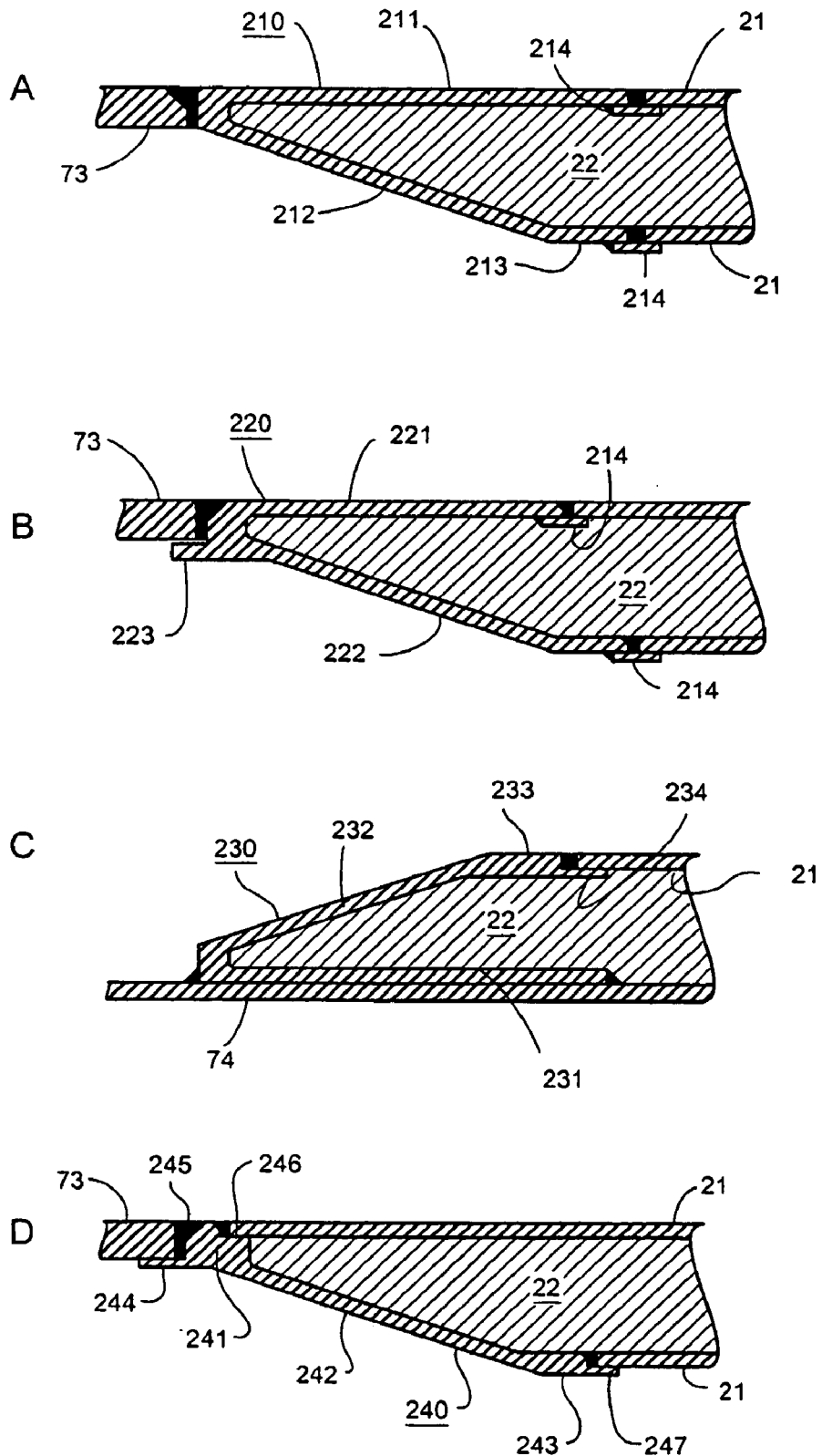

Transition profile 220 shown in FIG. 10B is a very similar to transition profile 210 of FIG. 10 A but the upper link member 221 is shortened so that the points of connection between plate portions 221, 222 and the respective outer plates 21 of the structural sandwich plate member are not aligned vertically and in which an additional backing bar detail has been included to facilitate the welding of the transition profile to the metal plate 73 at the weld location.

Transition profile 230 shown in FIG. 10C is for use where the existing plate 74 extends to form one of the outer plate members of the structural sandwich plate member, as in the case of structural overlays. The lower plate portion 231 is placed against and welded at its edges to plate 74. The upper plate portion 232 is joined at one edge to one edge of lower plate portion 231 and rises up so as to be spaced from lower plate portion 231 for connection to plate 21 which forms the other outer plate of the structural sandwich plate member.

A fourth transitional profile 240 is shown in FIG. 10D and is simpler to roll-form. Transitional profile 240 comprises a head portion 241, a main angled plate 242 and a tail portion 243. The head portion has a backing bar 244 and weld preparation 245 at a weld location for connection to an existing metal plate 73 as well as a shoulder 246 to receive one outer metal plate 21 of the structural sandwich plate element. The tail portion 243 has a backing bar 247 for receiving the other outer metal plate 21 whilst the main angled plate 242 makes the transition from the existing metal plate 73 to the full thickness of the structural sandwich plate member.

It will be appreciated that in describing the various profiles of the invention, directional terms such as "upper", "above" and "horizontal", etc., have been used with reference to the orientation of the various parts shown in the drawings. Of course, the various parts can also be used in other orientations, as desired. It will also be appreciated that the various profiles will be rolled or extruded with the shapes, dimensions and weld preparations that are satisfactory for both structural and economic considerations.

Figure 12:
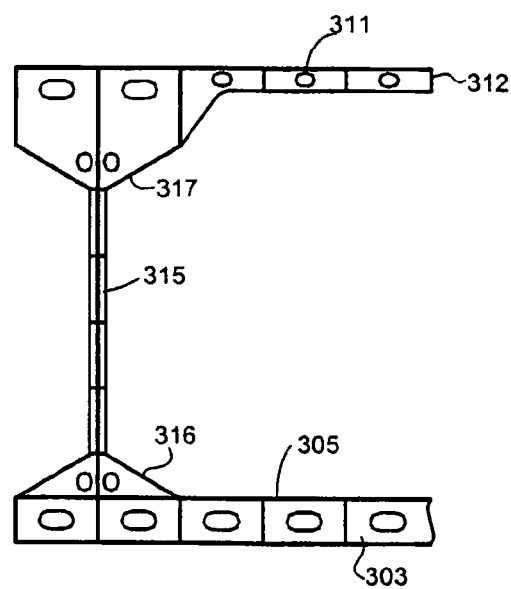
FIG. 12 is a mid-tank longitudinal section of the product oil tanker of FIG. 11.
Figure 13:
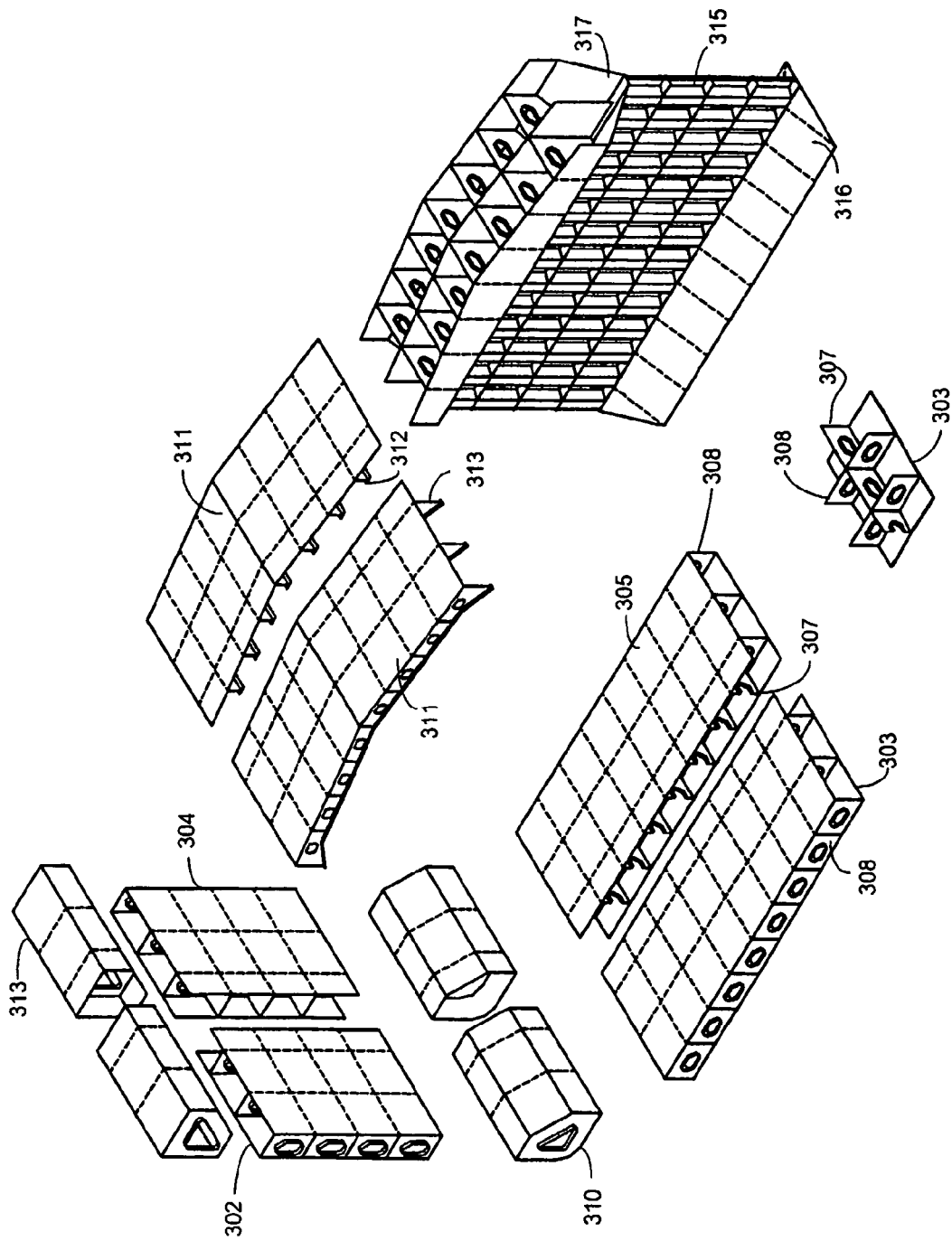
FIG. 13 is an exploded view showing the structural components of a mid-tank section of the product oil tanker of FIG. 11.

A mid-tank section of a 40,000 DWT product oil tanker 300 is shown in FIGS. 11 to 15 as an example of the use of structural sandwich plate members and structured profiles according to the present invention. FIG. 11 is a mid-tank cross section of the tanker 300 with the left hand part showing longitudinal framing and the right hand part showing a typical transverse frame. FIG. 12 is a longitudinal section for a portion of tank section along a longitudinal frame. FIG. 13 is an isometric exploded view of a typical tank section. FIG. 14 is a partially exploded view with enlarged portions showing the use of profiles according to the invention to connect a structural sandwich plate member, e.g. forming part of the inner or outer hull, to a perpendicular plate, e.g. a longitudinal or transverse framing plate. FIG. 15 is a perspective view of two hull sections with an enlarged portion showing the use of edge profiles according to the invention to join the modules.

For this particular example the deck plate 311, outer hull 302, 303, 310, 314 and inner hull 304, 305, 316, 317 would be constructed with structural sandwich plate members. The corrugated bulkhead 315, longitudinal framing 306, 307, 312 and transverse framing 308, 309, 313 would be constructed with metal plates. Profiles according to the present invention, described above and illustrated in FIGS. 1 to 10 would be used to join these members. All members are made continuous by welding and according to the present invention a significant number of structural sandwich plate elements may be prefabricated and subsequently welded together at a weld location on site.

In particular, the plate profiles 81, 82, 83, 84 shown in FIGS. 5A to D can be used to connect a longitudinal or transverse framing plate 306, 307, 308, 309, 312, 313 to a structural sandwich plate member 2d forming part of the inner or outer hulls 302, 303, 304, 305, 310, 314, 316, 317. An example of connection of a longitudinal framing plate is shown in greater detail in FIG. 14. As can there be seen, the structural sandwich plate member 2d is made up from three elongate steel plates 21a, 21b, 21c of which the largest 21a forms the outermost layer of the outer hull or the innermost layer of the inner hull. Edge profiles 1a, 1b, or 1c are welded along the short edges of the plate 21a, these edges will form the edge of a hull section in which the structural sandwich plate member 2d is to be incorporated and facilitate connection of hull sections as described above. Along the long edges of the plate 21a, socket profiles 71, 72 are welded to facilitate connection of the structural sandwich plate member 2d to adjacent members in the hull section. The plate profile 81, 82, 83 or 84 is welded along the centre line of plate 21a. Plates 21b and 21c can then be welded in place with the edge profiles 1a, 1b, 1c, or 1d, socket profiles 71, 72 and backing bars on the plate profile 81, 82, 83 or 84 supporting the plates 21b, 21c. With the plates 21b, 21c in place, two air-tight cavities are formed and these are then injected with elastomer to complete the structural sandwich plate member. The framing plate 306, 307 can then be welded to the plate profile 81 at the welding location which projects far enough from the structural sandwich plate member 2d to prevent the heat of welding damaging the elastomer. It will be appreciated that the construction of the structural sandwich plate member 2d and optionally also the connection of the longitudinal framing plate 306, 307 can be carried out in a factory rather than a shipyard, enabling improved dimensional accuracy and higher quality construction through well cured elastomer and good welds.

Other examples of the use of profiles according to the invention in the vessel of FIGS. 11 to 15 are:

complex profiles 110, 120, 130, 140, 150, 160, 170 to connect inner hull bottom 305 to hopper 318 to a longitudinal framing plate 307 or inner side shell 304 to hopper 318 to a longitudinal framing plate 306;

sandwich plate profiles 101 to 107 to connect deck 311 to side shell 304; and complex profiles 180, 190, 200 to connect hopper 318 to inner hull bottom 305 to stool 316.

As mentioned above, edge profiles according to the invention can be employed to facilitate connection of hull sections or modules of other structures, allowing the modules or sections to be constructed off-site for convenience and improved dimensional accuracy. This is illustrated in FIG. 15 which shows the connection of two hull modules 401, 402 of the vessel 300. The modules 401, 402 are constructed so that the edges of the structural sandwich plate members which form the edges of the sections are provided with edge profiles 1c. When the two modules 401, 402 are brought together, the free edges of the long flanges 11 of the edge profiles 1c can be displaced as necessary to line up against the end of the short flange of the edge profile 1c on the other section. Simply welding the long flanges to the short flanges at the weld location assisted by the built-in weld preparations, joins the two sections and forms cavity 5 which is subsequently injected with elastomer to form a composite structure.

Whilst we have described above exemplary embodiments of the invention, it will be appreciated that this description is not intended to be limitative and that variations and modifications may be made to the described embodiments without departing from the scope of the invention defined in the appended claims.

The invention claimed is:

1. A structural sandwich plate member comprising: a first outer metal plate including a left side plate and a right side plate and a second outer metal plate; an unfoamed polyurethane elastomer core bonded to said outer metal plates with sufficient strength to transfer shear forces therebetween; and a rolled or extruded edge member fitted between and connected to said first and second outer metal plates and extending along at least a part of the periphery of said outer metal plates and said profile providing a weld location suitable for welding said structural sandwich plate member to another structural sandwich plate member, said edge member comprising: a web extending perpendicularly to said first and second outer metal plates and having a first end and a second end, and a first flange disposed intermediate the first and second ends, the second end being welded to said second outer metal plate, the web extending from said second end to said first flange in contact with said polyurethane elastomer core, wherein the first flange is substantially parallel to said first outer metal plate in contact with said polyurethane elastomer core and welded to surfaces of said left side plate and said right side plate of said first outer metal plate that face the second outer metal plate, the web extending from said first flange in a direction away from said polyurethane elastomer core and perpendicularly to said first metal plate beyond said first flange and said first and second outer metal plates to said first end.

2. A structural sandwich plate member according to claim 1 wherein said edge member comprises: a second flange extending parallel to said first flange from said second end of said web and at least partially lying against said second outer plate.

3. A structural sandwich plate member according to claim 2 wherein said web is upstanding from one edge of said first flange.

4. A structural sandwich plate member according to claim 3 wherein said edge member further comprises a third flange substantially parallel to said first flange and projecting from said web in the opposite direction to said first flange, said third flange being positioned to act as a backing bar for welding said first outer plate to said edge member.

5. A structural sandwich plate member according to claim 2 wherein at least one edge of said first flange is provided with preparations for butt welding to another flange or plate.

6. A structural sandwich plate member according to claim 2 wherein said second flange extends beyond the edge of said second outer plate to act as a support for welding another plate or flange to said structural sandwich plate member.

7. A structural part comprising at least first and second structural sandwich plate members, said first structural sandwich plate member including a first outer plate including a left side plate and a right side plate and a second outer metal plate, an unfoamed polyurethane elastomer core bonded to said outer metal plates with sufficient strength to transfer shear forces therebetween, and a rolled or extruded edge member fitted between and connected to said first and second outer metal plates and extending along at least a part of the periphery of said outer metal plates, and said edge member providing a weld location suitable for welding said structural sandwich plate member to another structural sandwich plate member, said edge member comprising a web extending perpendicularly to said first and second outer metal plates and having a first end and a second end, and a first flange disposed intermediate the first and second ends, the second end being welded to said second outer metal plate, the web extending from said second end to said first flange in contact with said polyurethane elastomer core, wherein the first flange is substantially parallel to said first outer metal plate in contact with said polyurethane elastomer core and welded to surfaces of said left side plate and said right side plate of said first outer metal plate that face the second outer metal plate, the web extending from said first flange in a direction away from said polyurethane elastomer core and perpendicularly to said first metal plate beyond said first flange and said first and second outer metal plate to said first end, said second structural sandwich plate member comprising first and second outer metal plates and an elastomeric core bonded to said outer metal plates with sufficient strength to transfer shear forces therebetween, and said first and second structural sandwich plate members being joined together by welding along said edge member.

* * * * *